United States Patent
Reddy et al.

(10) Patent No.: US 10,423,472 B2
(45) Date of Patent: Sep. 24, 2019

(54) SYSTEM AND METHOD FOR PROVIDING EXTENDED JAVASCRIPT OBJECT NOTATION (JSON) REMOTE PROCEDURE CALL (RPC) WITH MEDIATOR

(71) Applicant: American Megatrends International, LLC, Norcross, GA (US)

(72) Inventors: Bakka Ravinder Reddy, Suwanee, GA (US); Joseprabu Inbaraj, Suwanee, GA (US); Divya Nettem, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 98 days.

(21) Appl. No.: 15/597,779

(22) Filed: May 17, 2017

(65) Prior Publication Data
US 2018/0336077 A1    Nov. 22, 2018

(51) Int. Cl.
*G06F 9/54* (2006.01)
*H04L 29/06* (2006.01)
*H04L 12/24* (2006.01)

(52) U.S. Cl.
CPC .......... *G06F 9/547* (2013.01); *H04L 41/0266* (2013.01); *H04L 67/40* (2013.01); *H04L 69/10* (2013.01)

(58) Field of Classification Search
CPC ..... G06F 9/547; H04L 41/0266; H04L 67/40; H04L 69/10
See application file for complete search history.

(56) References Cited

U.S. PATENT DOCUMENTS

| | | | | |
|---|---|---|---|---|
| 2002/0077979 A1* | 6/2002 | Nagata | ............... | G06Q 10/06 705/40 |
| 2005/0044224 A1* | 2/2005 | Jun | ............... | G06Q 20/10 709/225 |
| 2007/0022442 A1* | 1/2007 | Gil | ............... | G06F 17/30905 725/62 |
| 2008/0209534 A1* | 8/2008 | Keronen | ............... | G06Q 20/346 726/9 |
| 2011/0252071 A1* | 10/2011 | Cidon | ............... | G06F 17/30174 707/802 |

(Continued)

*Primary Examiner* — Tuan C Dao
(74) *Attorney, Agent, or Firm* — Locke Lord LLP; Tim Tingkang Xia, Esq.

(57) ABSTRACT

Systems and methods for providing an extended JavaScript Object Notation (JSON) remote procedure call (RPC) with a mediator in a management software in a host computing device. The management software implements a mediator using the extended JSON RPC format to forward a request from a remote computing device to a device to perform a method. In operation, the management software receives the request from the remote computing device. Then the mediator converts the request to an extended JSON RPC request, which includes first properties for performing a method on a target device and second properties not for performing the method. The mediator may store the first and second properties based on the extended JSON RPC request for internal use. Then the mediator generates a command based on the first properties of the extended JSON RPC request, and sends the command to the target device to perform the method.

14 Claims, 6 Drawing Sheets

(56) References Cited

U.S. PATENT DOCUMENTS

| | | | |
|---|---|---|---|
| 2014/0280756 A1* | 9/2014 | Maity | H04L 67/06 709/219 |
| 2014/0337467 A1* | 11/2014 | Pech | H04L 67/02 709/217 |
| 2016/0164929 A1* | 6/2016 | Bhalerao | H04L 65/608 709/204 |
| 2016/0360038 A1* | 12/2016 | Phelps | H04M 3/523 |

* cited by examiner

```
{
  "deviceInfo": [
    {
      "deviceIp": "xxx.xxx.xxx.xxx",     ⎤
      "userId": 2,                        ⎬ — 520
      "timestamp": 1234567                ⎦
    },
    {                                                                          ⎤
      "method": "action-name",                                                  │
      "params": [                                                               │
        {                                                                       │
          "firstparam": "This is the first parameter for action",               │
          "secondparam": "This is the second parameter for action"              ⎬ — 510
        },                                                                      │
        {                                                                       │
          "firstparam": "This is the first parameter for action",               │
          "secondparam": "This is the second parameter for action"              │
        }                                                                       │
      ],                                                                        │
      "id": 1                                                                   ⎦
    }
  ]
}
```

FIG. 5A

```
{
  "response": [
    {                      ⎤
      "cc": 0,              ⎬ — 540
      "logId": 100          ⎦
    },
    {                      ⎤
      "result": 0,          │
      "error": null,        ⎬ — 530
      "id": 1               ⎦
    }
  ]
}
```

SYSTEM AND METHOD FOR PROVIDING EXTENDED JAVASCRIPT OBJECT NOTATION (JSON) REMOTE PROCEDURE CALL (RPC) WITH MEDIATOR

FIELD

The present disclosure relates generally to management computer technology, and more particularly to systems and methods for providing an extended JavaScript Object Notation (JSON) remote procedure call (RPC) with a mediator.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In distributed computing, a remote procedure call (RPC) is when a computer program causes a procedure (subroutine) to execute in another address space (commonly on another computer on a shared network), which is coded as if it were a normal (local) procedure call, without the programmer explicitly coding the details for the remote interaction. However, the information that may be included in RPC requests or responses is limited.

Therefore, an unaddressed need exists in the art to address the aforementioned deficiencies and inadequacies.

SUMMARY

Certain aspects of the present disclosure relate to a system including a host computing device. In certain embodiments, the host computing device includes a processor and a storage device storing computer executable code. The computer executable code, when executed at the processor, is configured to: receive a request from a remote computing device; and in response to receiving the request, convert the request to an extended JavaScript Object Notation (JSON) remote procedure call (RPC) request, wherein the extended JSON RPC request includes first properties for performing a method on a target device and second properties not for performing the method; store the first properties and the second properties based on the extended JSON RPC request; generate a command based on the first properties of the extended JSON RPC request; and send the command to the target device to perform the method at the target device.

In certain embodiments, the request is in an Extensible Markup Language (XML) format, and the command is a Java command.

In certain embodiments, the first properties comprise a method identification of the method, at least one parameter for performing the method, and a request identification. In certain embodiments, the second properties comprise a device identification of the target device, a user identification, and a time stamp.

In certain embodiments, the computer executable code is further configured to: receive, from the target device, a response based on the method being performed at the target device; and in response to receiving the response, convert the response to an extended JSON RPC response, wherein the extended JSON RPC response includes third properties for generating a client response to the request and fourth properties not for generating the client response; store the third properties and the fourth properties based on the extended JSON RPC response; generate the client response based on the third properties of the extended JSON RPC response; and send the client response to the client computing device.

In certain embodiments, the response is a Java response, and the client response is in an XML format.

In certain embodiments, the third properties comprise a result of performing the method, an error message of performing the method, and a response identification, wherein the response identification is identical to the request identification.

In certain embodiments, the management controller is a baseboard management controller (BMC).

Certain aspects of the present disclosure relate to a method for providing an extended JSON RPC with a mediator in a management controller. In certain embodiments, the method includes: receiving, by the management controller, a request from a client computing device; and in response to receiving the request, converting, by the management controller, the request to an extended JSON RPC request, wherein the extended JSON RPC request includes first properties for performing a method on a target device and second properties not for performing the method; storing, at the management controller, the first properties and the second properties based on the extended JSON RPC request; generating, by the management controller, a command based on the extended JSON RPC request; and sending the command from the management controller to the target device to perform the method at the target device.

In certain embodiments, the request is in an XML format, and the command is a Java command.

In certain embodiments, the first properties comprise a method identification of the method, at least one parameter for performing the method, and a request identification, and the second properties comprise a device identification of the target device, a user identification, and a time stamp.

In certain embodiments, the method further includes: receiving, by the management controller from the target device, a response based on the method being performed at the target device; and in response to receiving the response, converting, by the management controller, the response to an extended JSON RPC response, wherein the extended JSON RPC response comprises third properties for generating a client response to the request and fourth properties not for generating the client response, storing, at the management controller, the third properties and the fourth properties based on the extended JSON RPC response; generating, by the management controller, the client response based on the third properties of the extended JSON RPC response; and sending the client response from the management controller to the client computing device.

In certain embodiments, the response is a Java response, and the client response is in an XML format.

In certain embodiments, the third properties comprise a result of performing the method, an error message of performing the method, and a response identification, wherein the response identification is identical to the request identification.

Certain aspects of the present disclosure relate to a non-transitory computer readable medium storing computer executable code. In certain embodiments, the computer executable code, when executed at a processor of a management controller, is configured to: receive a request from a client computing device; and in response to receiving the request, convert the request to an extended JSON RPC request, wherein the extended JSON RPC request includes first properties for performing a method on a target device and second properties not for performing the method; store the first properties and the second properties based on the extended JSON RPC request; generate a command based on the first properties of the extended JSON RPC request; and send the command to the target device to perform the method at the target device.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The term "remote procedure call" or its abbreviation "RPC" is a protocol that one program can use to request a service from a program located in another computer in a network without having to understand network details. A procedure call is also sometimes known as a function call or a subroutine call. RPC uses the client/server model.

The term "JavaScript Object Notation" or its abbreviation "JSON" is an open-standard format that uses human-readable text to transmit data objects consisting of attribute-value pairs. It is the most common data format used for asynchronous browser/server communication.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 1:
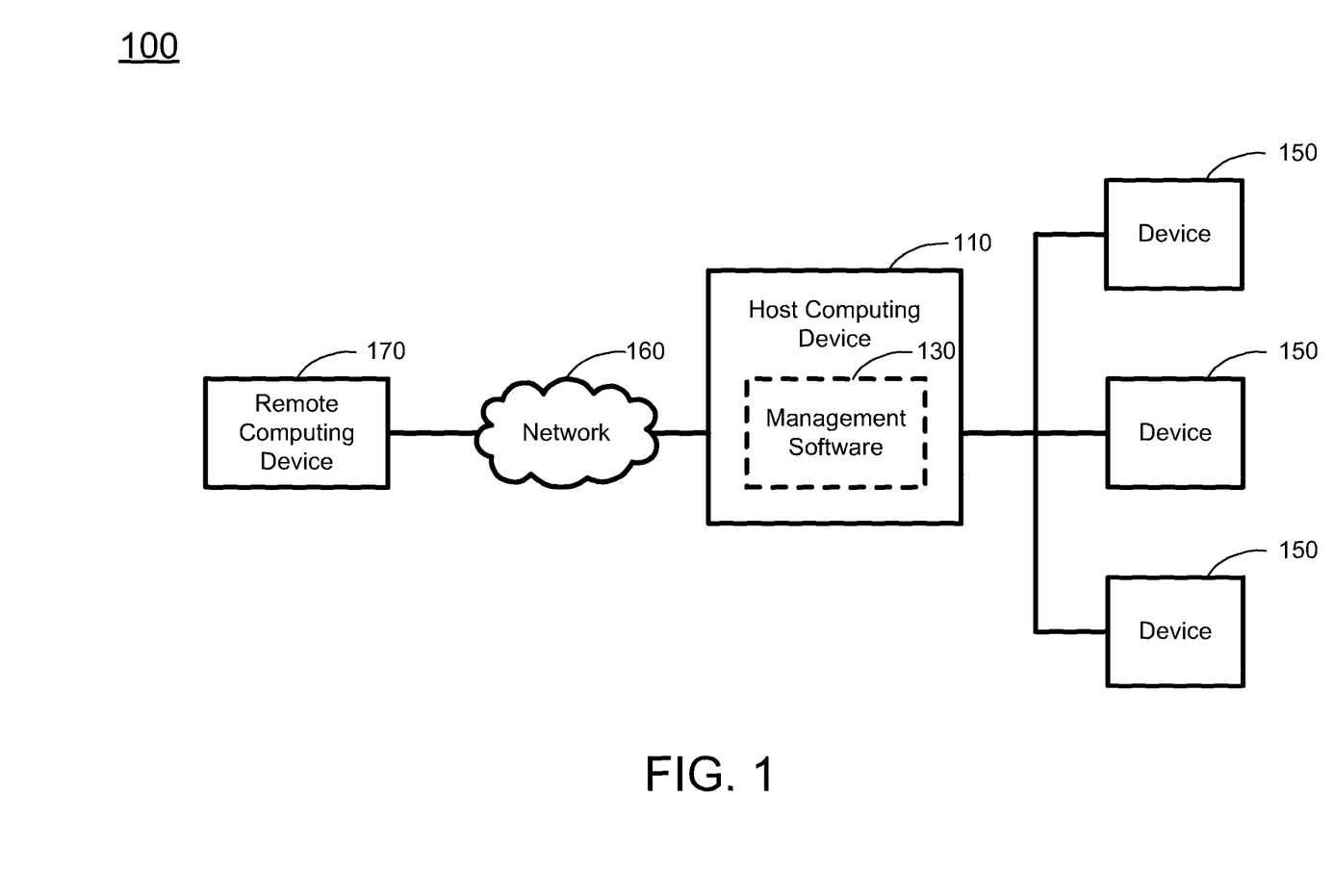
FIG. 1 schematically depicts a system according to certain embodiments of the present disclosure.

In accordance with the purposes of present disclosure, as embodied and broadly described herein, in certain aspects, the present disclosure relates to a system for providing JavaScript Object Notation (JSON) remote procedure call (RPC) with a mediator. FIG. 1 schematically depicts a system according to certain embodiments of the present disclosure. As shown in FIG. 1, the system 100 includes a host computing device 110, a management software 118 stored in the host computing device 110, a plurality of devices 150 managed by the host computing device 110, and optionally a remote computing device 170. In certain embodiments, each of the devices 150 is respectively connected to the host computing device 110 via an interface (not shown). The remote computing device 170 is connected to the host computing device 110 via a network 160. In certain embodiments, the system 100 is a client-server system, in which the remote computing device 170 functions as a client, and the host computing device 110 functions as a server. In certain embodiments, the devices 150 may be devices or components located in the host computing device 110. In certain embodiments, the network 160 may be a wired or wireless network, and may be of various forms. Examples of the network 160 may include, but is not limited to, a local area network (LAN), a wide area network (WAN) including the Internet, or any other type of networks. The best-known computer network is the Internet.

Figure 2:
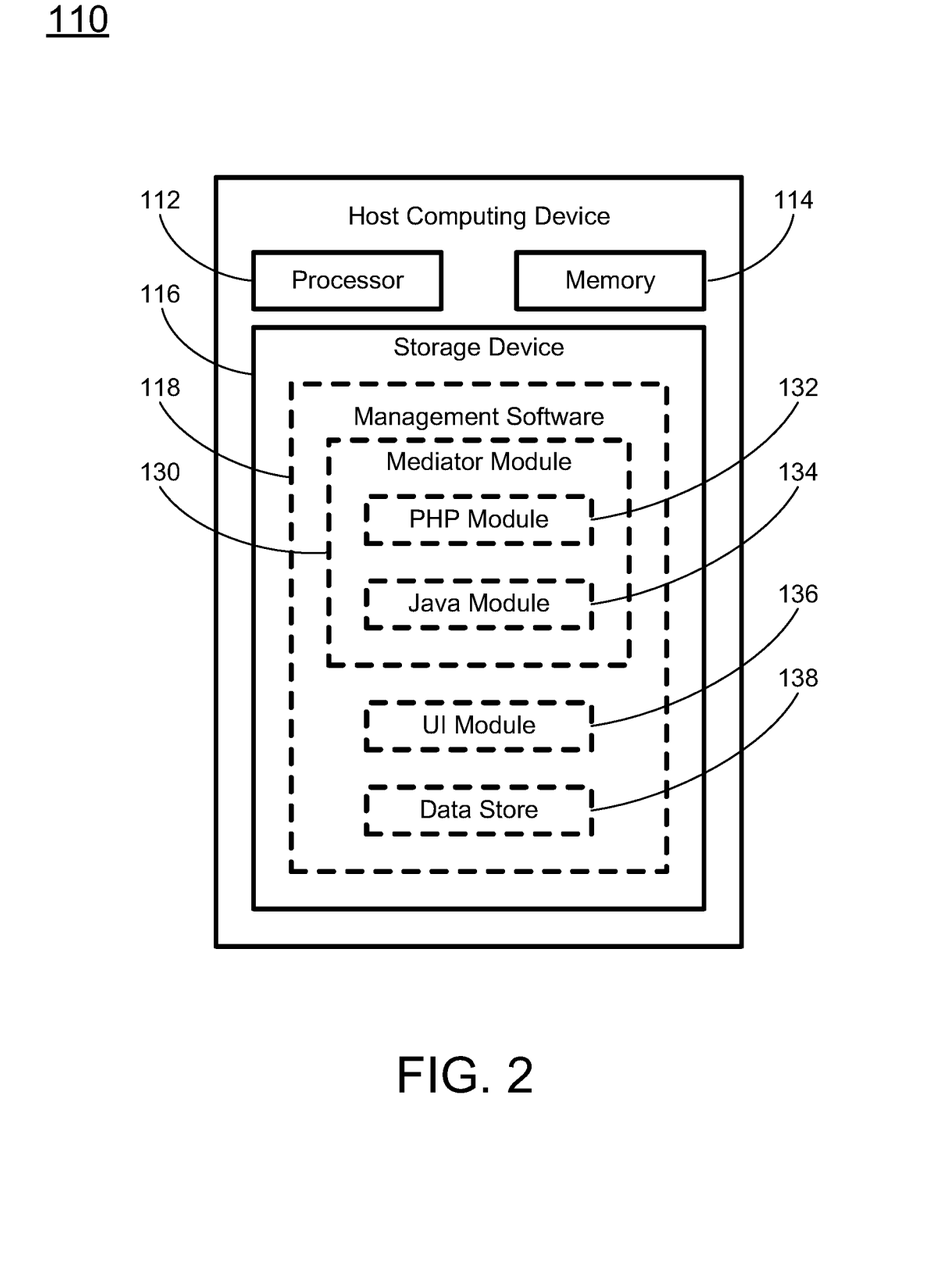
FIG. 2 schematically depicts a management controller according to certain embodiments of the present disclosure.

FIG. 2 schematically depicts a host computing device according to certain embodiments of the present disclosure. As shown in FIG. 2, the host computing device 110 includes a processor 112, a memory 114, and a storage device 116. In certain embodiments, the host computing device 110 may include other hardware components and software components (not shown) to perform its corresponding tasks. Examples of these hardware and software components may include, but not limited to, other required memory, interfaces, buses, input/output (I/O) modules or devices, network interfaces, and peripheral devices.

The processor 112 controls operation of the host computing device 110. In certain embodiments, the processor 112 may be a central processing unit (CPU). The processor 112 may execute any computer executable code or instructions, such as a management software 118 or other codes stored in the host computing device 110. In certain embodiments, the host computing device 110 may run on or more than one processor, such as two processors, four processors, eight processors, or any suitable number of processors.

The memory 114 may be a volatile memory, such as the random-access memory (RAM), for storing the data and information during the operation of the host computing device 110. In certain embodiments, the memory 114 may be a volatile memory array. In certain embodiments, the host computing device 110 may run on more than one memory 114.

The storage device 116 is a data storage media or device for storing the computer executable code of the host computing device 110. Examples of the storage device 116 may include hard drives, floppy disks, optical drives, non-volatile memory such as flash memory, memory cards, universal serial bus (USB) drives, or any other types of data storage devices. In certain embodiments, the host computing device 110 may have more than one storage device 116, and the management software 118 and other applications of the host computing device 110 may be stored in the more than one storage device 116 separately.

As shown in FIG. 2, the storage device 116 stores the management software 118 of the host computing device 110. The management software 118 of the host computing device 110 includes, among other things, a mediator module 130, a user interface (UI) module 136, and a data store module 138. The mediator module 130 is used to provide a mediator 131 for managing the request and the response between the remote computing device 170 and the devices 150. In certain embodiments, the mediator module 130 includes submodules, for example, a PHP module 132 and a Java module 134.

The PHP module 132 is a module configured to convert data, which may be a request from the remote computing device 170 or a response from the device 150, between a format used by the remote computing device 170 and an extended JSON RPC format. Specifically, the term "PHP" originally stood for Personal Home Page, but it now stands for the recursive acronym PHP: Hypertext Preprocessor. PHP is a server-side scripting language designed for web development but also used as a general-purpose programming language. In certain embodiments, the format being used by the remote computing device 170 may be the XML format, and the extended JSON RPC format is an extension of the mechanism of JSON RPC which is used for mediator processing. JSON RPC is used to call a remote procedure using JSON encoding. In JSON RPC, a remote method may be invoked by sending a request to a remote service using HTTP or a TCP/IP socket (starting with version 2.0). For example, a JSON RPC request must include properties such as a method, at least one parameter, and an identification; and a JSON RPC response must include properties such as a result, an error message, and an identification. However, the mediator may require extra information or properties in the request and response for internal purposes. Thus, the extended JSON RPC format may be provided, such that the extra properties being used by the mediator may be added in an extended JSON RPC request or an extended JSON RPC response. In certain embodiments, the PHP module 132, when executed at the processor 112, is configured to provide a PHP converter instance in the memory 114 for performing the above described functions to convert data (e.g., the request or the response) between the format used by the remote computing device 170 and the extended JSON RPC format. In certain embodiments, the PHP module 132 may be replaced by a module using a different of coding instead of PHP, as long as it can convert the data (e.g., the request or the response) between the format used by the remote computing device 170 and the extended JSON RPC format.

In certain embodiments, the PHP module 132 is configured to receive a request from the remote computing device 170, and convert the request to an extended JSON RPC request. In certain embodiments, the request is in the XML format. When the PHP module 132 converts the request to the extended JSON RPC request, the extended JSON RPC request may include two sets of properties, including a set of first properties for performing the method on the target device 150, and a set of second properties not for performing the method. For example, the first properties may include information of a method identification of the method, at least one parameter for performing the method, and a request identification (ID). On the other hand, the second properties may include a device identification of the target device 150, a user ID, and a time stamp. For example, the device identification of the target device 150 may be an internet protocol (IP) address of the target device 150, or any other information that may be used to identify the target device 150.

In certain embodiments, the PHP module 132 is configured to receive an extended JSON RPC response converted by the Java module 134, and convert the extended JSON RPC response to a client response for the remote computing device 170. In certain embodiments, the client response is in the XML format. In certain embodiments, the extended JSON RPC response may include two sets of properties, including a set of third properties for generating a client response to the request, and a set of fourth properties not for generating the client response. For example, the third properties may include information of a result of performing the method, an error message of performing the method, and a response ID. On the other hand, the fourth properties may include information of a completion code (CC) for performing the method, and a log ID. In certain embodiments, the response ID of the response may be identical to the request ID of the request of the response.

The Java module 134 is a module configured to convert data, which may be a request from the remote computing device 170 or a response from the device 150, between the extended JSON RPC format and the format used by the device 150 to perform the method, and to extract the information of the properties included in the data (e.g., the request or the response) in the extended JSON RPC format, and store the extracted information in the data store 138. In certain embodiments, the format used by the device 150 may be the Java encoded format. In certain embodiments, the Java module 134, when executed at the processor 112, is configured to provide a Java processor instance in the memory 114 for performing the above described functions. In certain embodiments, the Java module 134 may be replaced by a module using a different of coding instead of Java, as long as it can convert the data (e.g., the request or the response) between the extended JSON RPC format and the format used by the device 150 to perform the method.

The UI module 136 is a module which, when executed at the processor 112, provides a UI, such that a user of the management software 118 of the host computing device 110 can access the information stored in the data store 138 through the UI. In certain embodiments, the UI may be a web UI, which allows the user to remotely access the information. For example, the user may be located at the host computing device 110 or the remote computing device 170, and access the information remotely through the web UI. In certain embodiments, the user at the remote computing device 170 may use the web UI to input information of the request, and then controls the remote computing device 170 to send the request to the management software 118 of the host computing device 110 via the web UI. In certain embodiments, when the remote computing device 170 receives the client response from the management software 118, the user may use the web UI to access the information of the client response. In certain embodiments, the remote computing device 170 may have its own UI module to provide the UI for sending the request and receiving the client response.

The data store 138 is configured to store information of the management software 118. In certain embodiments, the information stored in the data store 138 may include, without being limited to, the log of the client request and the client response. Specifically, the data store 138 may store certain properties from the extended JSON RPC request and response. In certain embodiments, the stored data may be in the format of an event log or an event database.

The host computing device 110 is a host computer of the management software 118. In certain embodiments, the host computing device 110 may be a general purpose computer, a specialized computer, a server, or any other types of computing device. In certain embodiments, one or more of the devices 150 may be a part of the host computing device 110. In certain embodiments, the host computing device 110 may include necessary hardware components and software components (not shown) to perform its corresponding tasks. Examples of these hardware and software components may include, but not limited to, other required memory, interfaces, buses, input/output (I/O) modules and peripheral devices.

Each of the devices 150 is communicatively connected to the management software 118 of the host computing device 110, and may perform a method requested by the remote computing device 170. In certain embodiments, the devices 150 may be directly connected or remotely connected to the management software 118. In certain embodiments, some or all of the devices 150 may be devices or components of the host computing device 110. In certain embodiments, some or all of the devices 150 may be virtual devices implemented or emulated by software components. In certain embodiments, some or all of the devices 150 may each be an individual computing device independent from the host computing device 110, or may each be a device or a virtual device on an individual computing device independent from the host computing device 110. In certain embodiments, each of the devices 150 is connected to the host computing device 110 via an interface. In certain embodiments, some of the devices 150 may each be a remote device, which requires network connection to communicate with the host computing device 110. In certain embodiments, some of the devices 150 may be respectively connected to the host computing device 110 via a separate dedicated interface, and some of the devices 150 may share one or more interfaces or network to communicate with the host computing device 110.

The remote computing device 170 is a computer communicatively connected to the host computing device 110 via the network 160. In certain embodiments, the system 100 may include more than one remote computing devices 170, and each of the one or more remote computing devices 170 may be respectively connected to the host computing device 110 via the network 160. In certain embodiments, the remote computing device 170 may be a general purpose computer, a specialized computer, a thin client, a mobile device such as a laptop computer, a smartphone or a tablet, a management controller, a system-on-chip (SOC), or any other types of computing devices.

Figure 3:
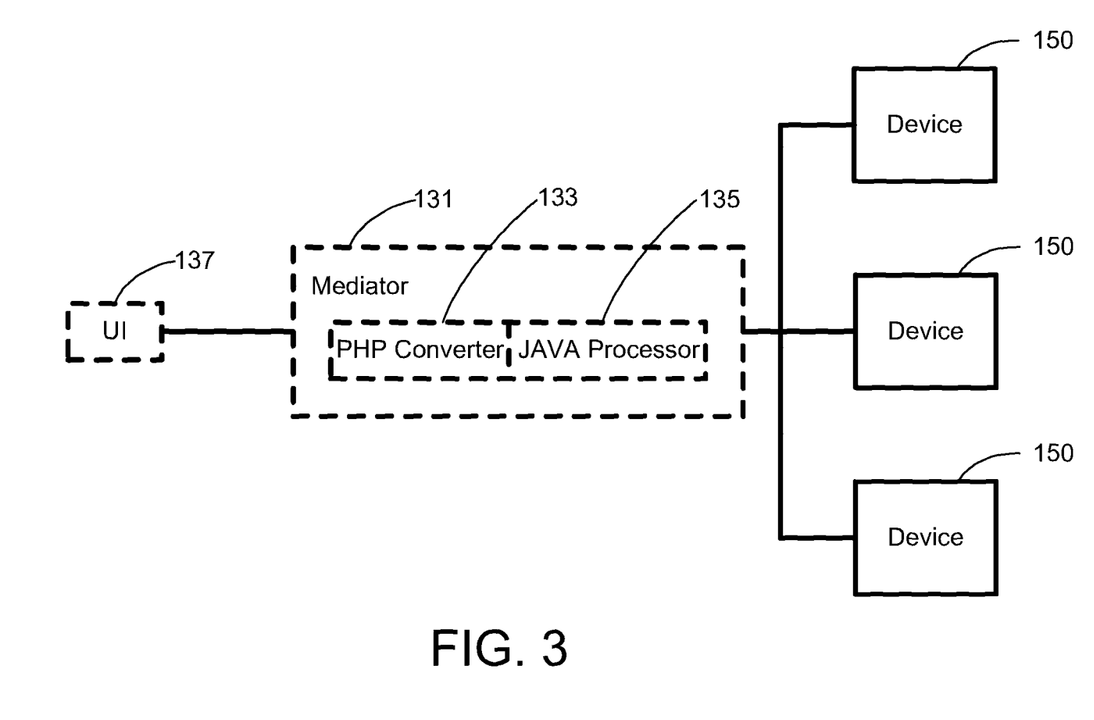
FIG. 3 schematically depicts a mediator of the management controller according to certain embodiments of the present disclosure.

FIG. 3 schematically depicts a mediator of the host computing device according to certain embodiments of the present disclosure. As shown in FIG. 3, when the management software 118 is executed by the processor 112 in the memory 114, a mediator 131 and a UI 137 are provided. The UI 137 is provided, for example, at the remote computing device 170 or the host computing device 110 as a web UI for the user to send requests to the management software 118 and receive client responses from the management software 118. In certain embodiments, the UI 137 may also be used for the user to view data stored in the data store 138, such as logs of the mediator RPC and the server response. In certain embodiments, the mediator 131 includes a PHP converter 133 implemented by the executing PHP module 132, and a Java processor 135 implemented by the executing Java module 134.

Figure 4:
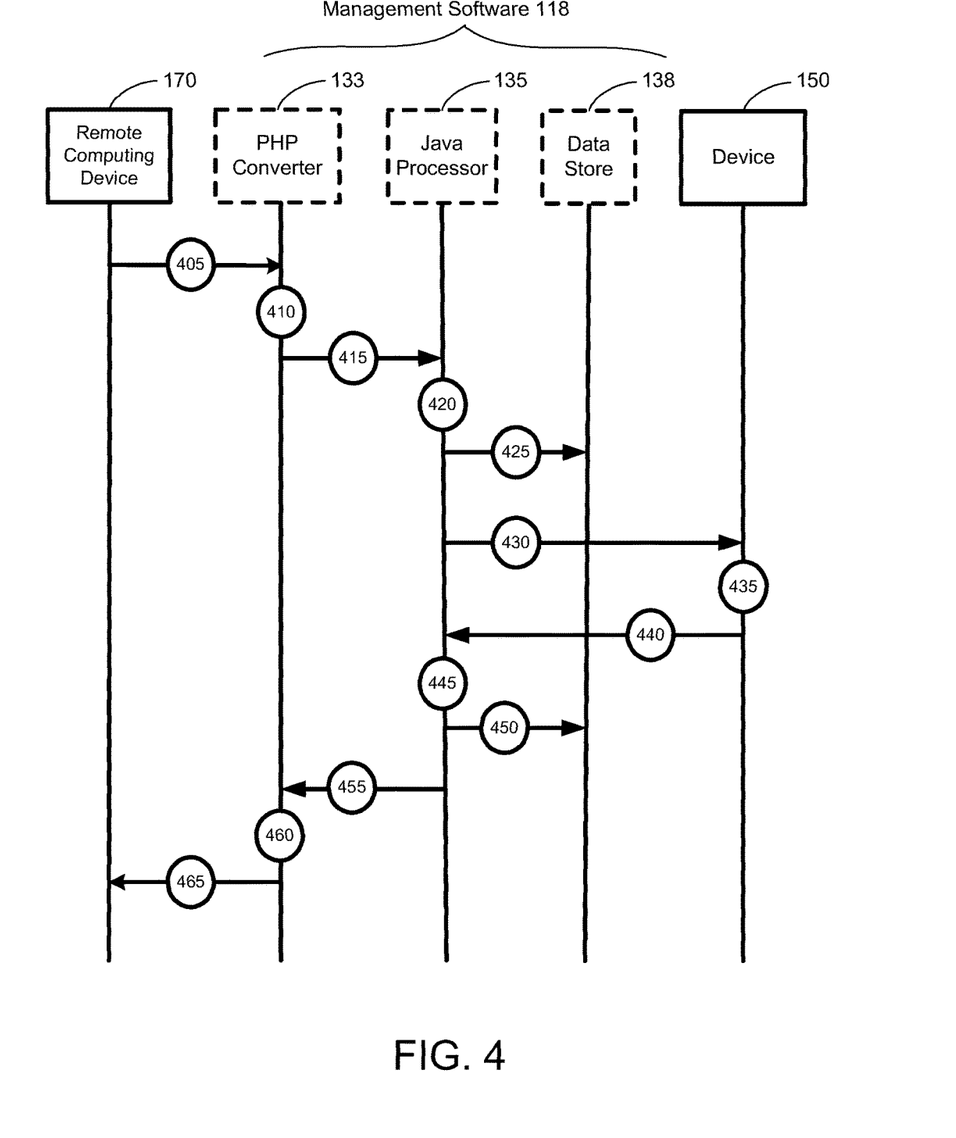
FIG. 4 schematically depicts a process of using an extended JSON RPC with the mediator according to certain embodiments of the present disclosure.

FIG. 4 schematically depicts a process of using an extended JSON RPC with the mediator according to certain embodiments of the present disclosure. In certain embodiments, the process as shown in FIG. 4 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 4.

As shown in FIG. 4, at procedure 405, the remote computing device 170 sends a request to the management software 118 of the host computing device 110 via the network 160. The request may be sent using HTTP or a TCP/IP socket. In certain embodiments, the request may be in the XML format, and may be generated by an application running on the remote computing device 170, or generated by a user. In certain embodiments, the request includes information of the method to be performed at the target device 150, and other information that may be used by the host computing device 110. In certain embodiments, the information of the method to be performed at the target device 150 may be related to the first properties of the extended JSON RPC request, and the information that may be used by the host computing device 110 may be related to the second properties of the extended JSON RPC request. For example, the information of the method to be performed at the target device 150 may include, without being limited to, information of a method identification of the method, one or more parameters for performing the method, and a request ID. The information that may be used by the host computing device 110 may include, without being limited to, a device identification of the target device, a user identification, and a time stamp. For example, the device identification of the target device 150 may be an IP address of the target device 150, or any other identification information that may be used to identify the target device 150. In certain embodiments, the time stamp may be used to identify a sending time of the request.

Upon receiving the request from the remote computing device 170, at procedure 410, the PHP converter 133 converts the request to an extended JSON RPC request. For example, if the request is in the XML format, the PHP converter 133 converts the XML request into the JSON format to form the extended JSON RPC request. In certain embodiments, the extended JSON RPC request may include two sets of properties, including a set of first properties for performing the method on the target device 150 (which correspond to the information of the method to be performed at the target device 150 in the request), and a set of second properties not for performing the method (which correspond to the information that may be used by the host computing device 110 in the request). For example, the first properties may include information of the method identification of the method, one or more parameters for performing the method, and the request ID. On the other hand, the second properties may include the device identification of the target device 150, a user identification, and a time stamp. In certain embodiments, the PHP converter 133 may be located in the remote computing device 170, so that the remote computing device 170 may send the request directly in the extended JSON RPC format to the mediator 131.

Figure 5A:
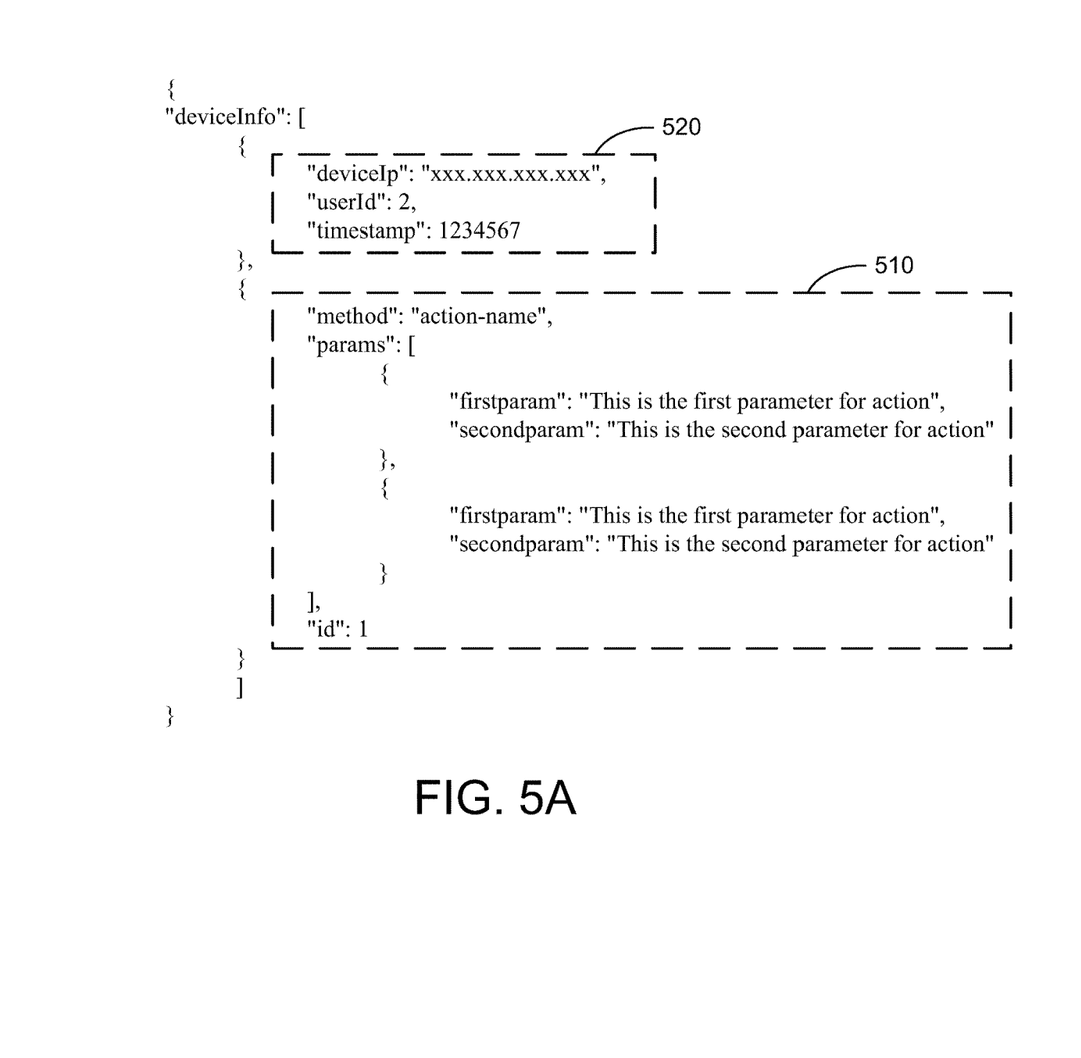
FIG. 5A depicts an example of an extended JSON RPC request according to certain embodiments of the present disclosure.

FIG. 5A depicts an example of an extended JSON RPC request according to certain embodiments of the present disclosure. As shown in FIG. 5A, the extended JSON RPC request include the first properties 510 and the second properties 520. The first properties 510 include information of the method identification of the method (in this case an action name), one or more parameters for performing the method (in this case two sets of parameters, each set having two parameters), and the request ID (in this case the request ID is a number "1"). The second properties 520 include information of the device identification of the target device 150 (in this case an IP address of the target device 150), a user ID (in this case the user ID is a number "2"), and a time stamp (in this case a number "1234567").

Referring back to FIG. 4, once the extended JSON RPC request is generated, at procedure 415, the PHP converter 133 sends the extended JSON RPC request to the Java processor 135. At procedure 420, the Java processor 135 processes the extended JSON RPC request in order to generate a corresponding command. In certain embodiments, the command being generated by the Java processor 135 is a Java command. Specifically, the Java processor 135 processes the extended JSON RPC request to obtain the necessary properties of the extended JSON RPC request, which may include the first properties and the second properties, and the Java command may be generated based on these properties. At procedure 425, the Java processor 135 stores the properties into the data store 138. In certain embodiments, those properties obtained from the mediator RPC may be stored as a log file, or as an entry of a database.

In certain embodiments, the Java processor 135 may only store a part of the properties in the data store 138. At procedure 430, the Java processor 135 sends the command to the target device 150 to perform the method at the target device 150.

At procedure 435, upon receiving the command, the device 150 performs the method based on the command. In performing the method, the device 150 may generate a response based on the method being performed. In certain embodiments, the response is a Java response. In certain embodiments, the response include information of the method performed at the device 150, and other information that may be used by the management software 118 of the host computing device 110. In certain embodiments, the information of the method performed at the device 150 may be related to the third properties of the extended JSON RPC response, and the information that may be used by the host computing device 110 may be related to the fourth properties of the extended JSON RPC response. For example, the information of the method performed at the device 150 may include, without being limited to, information of a result of performing the method, an error message of performing the method, and a response ID. On the other hand, the information that may be used by the host computing device 110 may include, without being limited to, information of a completion code (CC) for performing the method, and a log ID. In certain embodiments, the response ID of the response may be identical to the request ID of the request of the response. At procedure 440, the device 150 may send the response to the Java processor 135.

Upon receiving or retrieving the response from the device 150, at procedure 445, the Java processor 135 obtains the information from the response, and generates a corresponding extended JSON RPC response based on the information obtained from the response. In certain embodiments, the extended JSON RPC response may include two sets of properties, including a set of third properties for generating a client response to the request (which correspond to the information of the method performed at the device 150 in the response), and a set of fourth properties not for generating the client response (which correspond to the information that may be used by the management software 118 of the host computing device 110 in the response). For example, the third properties may include information of the result of performing the method, an error message of performing the method, and the response ID. On the other hand, the fourth properties may include information of the completion code (CC) for performing the method, and the log ID. In certain embodiments, the response ID of the response may be identical to the request ID of the request of the response.

Figure 5B:
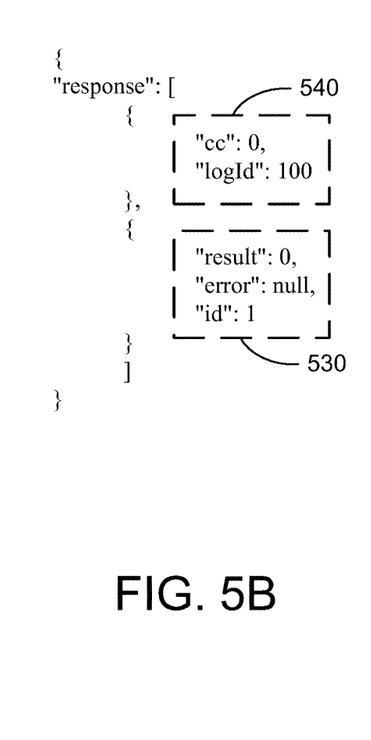
FIG. 5B depicts an example of an extended JSON RPC response according to certain embodiments of the present disclosure.

FIG. 5B depicts an example of an extended JSON RPC response according to certain embodiments of the present disclosure. As shown in FIG. 5B, the extended JSON RPC response includes the third properties 530 and the fourth properties 540. The third properties 510 include information of the result of performing the method (in this case the result is a number "0"), an error message of performing the method (in this case the error message is null, indicating no error occurred in performing the method), and the response ID (in this case the response id is a number "1", which is identical to the request ID). The fourth properties 540 include information of the completion code (CC) for performing the method (in this case the CC is a number "0"), and the log ID (in this case the log ID is a number "100").

Referring back to FIG. 4, once the extended JSON RPC response is generated, at procedure 450, the Java processor 135 stores the properties into the data store 138. In certain embodiments, the properties of the server response may be stored as a log file, or an entry of a database. In certain embodiments, the Java processor 135 may only store a part of the properties into the data store 138. In certain embodiments, the properties being stored in the data store 138 at procedures 425 and 450 may be arranged as one log file or one entry of the database, such that the administrator can easily monitor the request and the corresponding. At procedure 455, the Java processor 135 forwards the RPC response to the PHP converter 133.

Upon receiving the extended JSON RPC response from the Java processor 135, at procedure 460, the PHP converter 133 converts the extended JSON RPC response to a client response. In certain embodiments, the PHP converter 133 may generate the client response based on the third properties of the extended JSON RPC response. In certain embodiments, the client response may be in the XML format. At procedure 465, the host computing device 110 sends the client response to the remote computing device 170 via the network 160.

In the above example, the extended JSON RPC format is used in the mediator of the host computing device 110 to process the different properties of the request and response. As discussed above, the extended JSON RPC format is an extension of the mechanism of JSON RPC which is used for mediator processing. A JSON RPC request must include properties such as a method, at least one parameter, and an identification; and a JSON RPC response must include properties such as a result, an error message, and an identification. However, the mediator may require extra information or properties in the request and response for internal purposes. Thus, the extended JSON RPC format may be provided, such that the extra properties being used by the mediator may be added in an extended JSON RPC request (e.g., as the second properties) or an extended JSON RPC response (e.g., as the fourth properties).

Figure 6:
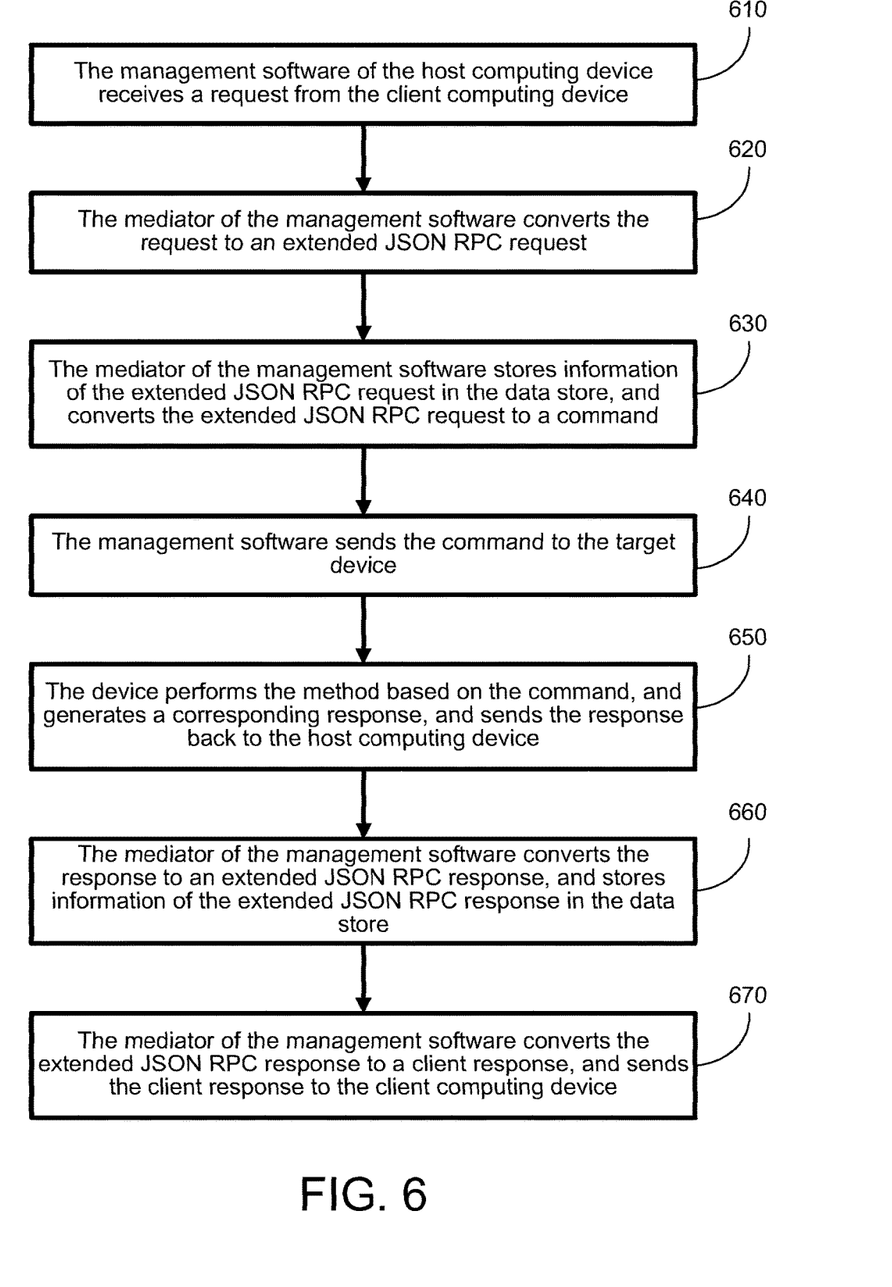
FIG. 6 schematically depicts a flowchart of a method for providing an extended JSON RPC with the mediator in a management controller according to certain embodiments of the present disclosure.

FIG. 6 schematically depicts a flowchart of a method for providing an extended JSON RPC with the mediator in a management controller according to certain embodiments of the present disclosure. In certain embodiments, the method as shown in FIG. 6 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 6.

As shown in FIG. 6, at procedure 610, the management software 118 of the host computing device 110 receives a request from the remote computing device 170 via the network 160. In response to receiving the request, at procedure 620, the mediator 131 of the management software 118 of the host computing device 110 converts the client RPC to an extended JSON RPC request. In certain embodiments, the procedure 620 is performed by the PHP converter 133 as shown in FIGS. 3 and 4. In certain embodiments, the extended JSON RPC request includes first properties for performing a method on a target device and second properties not for performing the method.

At procedure 630, the mediator 131 of the management software 118 stores information of the extended JSON RPC request in the data store 138, and converts the extended JSON RPC request to a command based on the extended JSON RPC request. In certain embodiments, the procedure 630 is performed by the Java processor 135 as shown in FIGS. 3 and 4. In certain embodiments, the information of the extended JSON RPC request being stored in the data store 138 may include the first properties and the second properties.

At procedure 640, the host computing device 110 sends the command to the target device 150. At procedure 650, the device 150 performs the method based on the command. In performing the method, the device 150 generates a corresponding response, and sends the response back to the management software 118 of the host computing device 110. In certain embodiments, the response may be a Java response.

Upon receiving or retrieving the Java response from the server computing device 150, at procedure 660, the mediator 131 of the management software 118 of the host computing device 110 converts the response to an extended JSON RPC response, and stores information of the extended JSON RPC response in the data store 138. In certain embodiments, the procedure 660 is performed by the Java processor 135 as shown in FIGS. 3 and 4. In certain embodiments, the information of the extended JSON RPC response being stored in the data store 138 may include the third properties and the fourth properties.

At procedure 670, the mediator 131 of the management software 118 of the host computing device 110 converts the extended JSON RPC response to a client response, and sends the client response to the remote computing device 170 via the network 160. In certain embodiments, the procedure 670 is performed by the PHP converter 133 as shown in FIGS. 3 and 4.

As described in the above-mentioned embodiments, by providing a mediator with the extended JSON RPC, extra properties of the RPC request and response can be recorded, which is convenient for an administrator or a user to monitor the RPC process, the usage of the resources by the users or remote computers. It is helpful for maintaining the client-server system and use the client-server system efficiently.

In another aspect, the present disclosure relates to a non-transitory computer readable medium storing computer executable code. In certain embodiments, the computer executable code may be the management software 118 stored in the storage device 116 as described above. The computer executable code, when being executed, may perform one of the methods described above. In certain embodiments, the non-transitory computer readable medium may include, but not limited to, the storage device 116 of the host computing device 110 as described above, or any other storage media of the host computing device 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a host computing device, comprising a processor and a storage device storing computer executable code, wherein the computer executable code, when executed at the processor, is configured to:
receive a request from a remote computing device;
in response to receiving the request,
convert the request to an extended JavaScript Object Notation (JSON) remote procedure call (RPC) request, wherein the extended JSON RPC request comprises first properties for performing a method on a target device and second properties not for performing the method;
store the first properties and the second properties based on the extended JSON RPC request;
generate a command to perform the method at the target device, based on the first properties of the extended JSON RPC request; and
send the command to the target device to perform the method at the target device;
receive, from the target device, a response based on the method being performed at the target device; and
in response to receiving the response,
convert the response to an extended JSON RPC response, wherein the extended JSON RPC response comprises third properties for generating a client response to the request and fourth properties not for generating the client response;
store the third properties and the fourth properties based on the extended JSON RPC response;
generate the client response based on the third properties of the extended JSON RPC response; and
send the client response to the remote computing device;
wherein the first properties comprise a method identification of the method, at least one parameter for performing the method, and a request identification.

2. The system of claim 1, wherein the request is in an Extensible Markup Language (XML) format, and the command is a Java command.

3. The system of claim 1, wherein the second properties comprise a device identification of the target device, a user identification, and a time stamp.

4. The system of claim 1, wherein the response is a Java response, and the client response is in an Extensible Markup Language (XML) format.

5. The system of claim 1, wherein the third properties comprise a result of performing the method, an error message of performing the method, and a response identification, wherein the response identification is identical to the request identification.

6. The system of claim 1, wherein the host computing device is a baseboard management controller (BMC).

7. A method for providing an extended JavaScript Object Notation (JSON) Remote Procedure Call (RPC) with a mediator in a management software of a host computing device, comprising:
receiving, by the management software, a request from a remote computing device;
in response to receiving the request,
converting, by the management software, the request to an extended JSON RPC request, wherein the extended JSON RPC request comprises first properties for performing a method on a target device and second properties not for performing the method;

storing, at the management software, the first properties and the second properties based on the extended JSON RPC request;
generating, by the management software, a command to perform the method at the target device, based on the extended JSON RPC request; and
sending the command from the management software to the target device to perform the method at the target device;
receiving, by the management software from the target device, a response based on the method being performed at the target device; and
in response to receiving the response,
converting, by the management software, the response to an extended JSON RPC response, wherein the extended JSON RPC response comprises third properties for generating a client response to the request and fourth properties not for generating the client response,
storing, at the management software, the third properties and the fourth properties based on the extended JSON RPC response;
generating, by the management software, the client response based on the third properties of the extended JSON RPC response; and
sending the client response from the management software to the remote computing device;
wherein the first properties comprise a method identification of the method, at least one parameter for performing the method, and a request identification, and the second properties comprise a device identification of the target device, a user identification, and a time stamp.

8. The method of claim 7, wherein the request is in an Extensible Markup Language (XML) format, and the command is a Java command.

9. The method of claim 7, wherein the response is a Java response, and the client response is in an Extensible Markup Language (XML) format.

10. The method of claim 7, wherein the third properties comprise a result of performing the method, an error message of performing the method, and a response identification, wherein the response identification is identical to the request identification.

11. A non-transitory computer readable medium storing computer executable code, wherein the computer executable code, when executed at a processor of a host computing device, is configured to:

receive a request from a remote computing device;
in response to receiving the request,
convert the request to an extended JavaScript Object Notation (JSON) remote procedure call (RPC) request, wherein the extended JSON RPC request comprises first properties for performing a method on a target device and second properties not for performing the method;
store the first properties and the second properties based on the extended JSON RPC request;
generate a command to perform the method at the target device, based on the first properties of the extended JSON RPC request; and
send the command to the target device to perform the method at the target device;
receive, from the device, a response based on the method being performed at the target device; and
in response to receiving the response,
convert the response to an extended JSON RPC response, wherein the extended JSON RPC response comprises third properties for generating a client response to the request and fourth properties not for generating the client response;
store the third properties and the fourth properties based on the extended JSON RPC response;
generate the client response based on the third properties of the extended JSON RPC response; and
send the client response to the remote computing device;
wherein the first properties comprise a method identification of the method, at least one parameter for performing the method, and a request identification, and the second properties comprise a device identification of the target device, a user identification, and a time stamp.

12. The non-transitory computer readable medium of claim 11, wherein the request is in an Extensible Markup Language (XML) format, and the command is a Java command.

13. The non-transitory computer readable medium of claim 11, wherein the response is a Java response, and the client response is in an Extensible Markup Language (XML) format.

14. The non-transitory computer readable medium of claim 11, wherein the third properties comprise a result of performing the method, an error message of performing the method, and a response identification, wherein the response identification is identical to the request identification.

* * * * *